United States Patent Office 3,707,563
Patented Dec. 26, 1972

---

3,707,563
PROCESS FOR PREPARING N-ALKYLATED
ALIPHATIC DIAMINES
Josef Pikl, Glassboro, N.J., assignor to E. I. du Pont
de Nemours and Company, Wilmington, Del.
No Drawing. Filed Sept. 14, 1970, Ser. No. 72,202
Int. Cl. C07c 87/14
U.S. Cl. 260—583 P
2 Claims

ABSTRACT OF THE DISCLOSURE

A mixture of secondary and disecondary amines having the formula

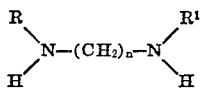

where $n$ equals 2 to 8, R equals a $C_2$ to $C_6$ saturated aliphatic hydrocarbon radical and $R^1$ equals R or H can be prepared in high yield by reacting aldehyde and diamine in an aqueous system in a molar ratio of from about 1.2:1.0 to about 1.9:1.0 at from 0° to 50° C. in the absence of hydrogen to form a diimine and then reducing the diimine in situ under hydrogen pressure with essentially complete utilization of the aldehyde and diamine.

BACKGROUND OF THE INVENTION

Polyamides, known as nylons, are formed by reaction of diamines and dicarboxylic acids. Properties of the polymers can be varied by changing the diamines and acids used, adjusting the molecular weight and also by using secondary diamines in place of primary diamines. A tertiary amino group will not extend the polymerization in the usual way, but rather "end caps" the polymer. Both primary and secondary diamines will take part in the polymerization. Bruner, in U.S. Pat. 2,497,292, teaches the utility of both N-alkyl and N,N'-dialkyl diamines for use as polyamide intermediates. Prior art, nevertheless, has been devoted to methods for obtaining good yield and quality of either the N-alkyl or N,N'-dialkyl compounds. With ketones added to diamines reasonably good yields of up to 95% are readily obtained. With aldehydes such as butyraldehyde, prior art yields are usually in the order of 85% or lower. With acetaldehyde even lower yields are normal. The art is directed towards producing specifically monoalkyl or dialkyl compounds in as high a yield as possible (see U.S. Pat. 2,317,757). In attempting to achieve this end the reaction of the aldehyde with diamine has always been done in molar ratios designed to produce the desired product. But even when the apparent optimum molar ratios (i.e., 1:1, 2:1, etc.) were employed low yields of the desired product (monoalkyl or dialkyl) and overall low yields (app. 65%) of total N-alkylated aliphatic diamines resulted due to tar (high boiling fraction) formation.

SUMMARY OF THE INVENTION

Mixtures of N-alkylated aliphatic diamines of the type

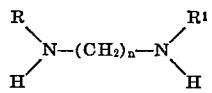

where $n$ equals 2 to 8, R equals a $C_2$ to $C_6$ saturated aliphatic hydrocarbon radical and $R^1$ equals R or H, can be prepared in high yield by an improvement in the aqueous process of reacting at from about 0° to about 50° C. an aliphatic aldehyde having the formula

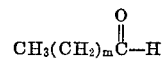

where $m$ equals 0–4 with a diamine having the formula $NH_2(CH_2)_nNH_2$ where $n$ is as defined above to form a diimine and then reducing the diimine in situ with hydrogen, comprising reacting the aldehyde and diamine at molar ratios of from about 1.2:1.0 to about 1.9:1.0 in the absence of hydrogen.

DESCRIPTION OF THE INVENTION

Applicant has recognized both the utility of mixtures of N-alkyl and N,N'-dialkyl diamines and also the opportunity for economical usage of materials by adjusting the mole ratio of the reactants so as to produce mixtures with minimal amounts of both unreacted starting materials and over-reacted products such as trialkyl compounds or tars.

According to the process of the invention a hydrogenation catalyst is first mixed with a diamine (either pure or as a diluted aqueous or aqueous-alcohol solution). The aldehyde is then added to or mixed with the diamine under conditions of good mixing with exterior cooling to keep the temperature at from about 0° to about 40° C. This reaction is carried out at atmospheric pressure, although pressure is not critical. Either batch or continuous mixing can be used, but in any case the reaction must be performed in the absence of hydrogen, preferably under an inert gas such as nitrogen. The reaction is rapid with aldehydes of no more than 6 carbon atoms, and goes more rapidly with aldehydes of lower molecular weight. The diimine (Schiff base) products are somewhat unstable and are best converted to amines immediately after their formation. The most convenient method for reducing the diimines to diamines is catalytic hydrogenation, which can be performed under a wide range of pressure conditions. In the preferred process the temperature of the reaction is held at from about 0° to about 50° and hydrogen is applied at from about 500 to about 1000 lbs./sq. in. gage pressure until absorption ceases. The temperature of the reaction mass is then raised by about 25° C. and maintained for about 2 hours with hydrogen pressure held the same. The mass is then cooled and filtered, preferably using a filter aid such as diatomaceous earth to remove the catalyst particles. The filtered product can be used in subsequent reaction without further purification or may be distilled under reduced pressure, first removing water and unreacted diamine as a foreshot and then removing the N-alkylated aliphatic diamines leaving high boilers in the still pot.

The process has been tested extensively with hexamethylene diamine and n-butyraldehyde, n-propionaldehyde, and acetaldehyde. The principles can be applied to reactions using aldehydes such as heptanaldehyde, laurinaldehyde, valeraldehyde, caproaldehyde, etc. and benzaldehyde, tolualdehyde an other aromatic aldehydes. In addition to hexamethylene diamine other polyamines with which the process of the invention can be used include ethylene diamine, propylene diamine, tetramethylene diamine, pentamethylene diamine and octamethylene diamine.

The preferred hydrogenation catalyst is a 5% Pt on carbon catalyst, normally used as 0.1% to 0.5% depending on catalyst activity. Other precious metal and nickel catalysts promote hydrogenation of the diimine compounds but at a lower, less rapid rate. In the preferred batch procedure the catalyst is stirred in the diamine before the aldehyde is added.

The amine can be used as an aqueous solution, for example hexamethylene diamine can be used as an 80–95% aqueous solution, in which form it is commercially available. Co-solvents such as alcohol have not been found essential, though useful for maintaining solubilizing conditions especially where reactions are run at low temperature (0°–20° C.). The aldehydes used should be reasonably pure. Technical grade material is generally satisfactory.

The Schiff's bases formed from diamines and acetaldehyde are quite unstable, the "tar" or higher boiling impurity in the product from hexamethylene diamine and acetaldehyde increasing from 4% to 19% in 18 hours even when the product is held at 0° C. The product made from hexamethylene diamine and n-butyraldehyde is more stable, showing only 2% increase in "tar" when reacted at 50° C. instead of 30° C. Tar formation is minimized by conducting the reaction in the environment diluted with alcohol or water, by holding the reaction mass at lowered temperatures, conducting the reaction under an inert atmosphere and also by conducting the hydrogenation immediately after diimine formation is complete.

1,6-hexamethylene diamine is commonly available as an 80% to 95% aqueous solution. Yields of diimine product tend to be better with diamine solutions of lower concentration, especially with the lower molecular weight aldehydes. The improved yield with lower concentration must of course be balanced against loss of time and productivity due to processing the diluent water or alcohol. In laboratory work diamine concentrations as low as 30% have been found to give the best yields and lowest tar formation.

While reaction between diamines and aldehydes at temperatures up to 50° C. promotes tar formation more than reaction at 0°–10° C., the higher temperatures, especially in the case of $C_4$ and higher aldehydes, also promotes the formation of the desired products. For the reaction between hexamethylene diamine and butyraldehyde the preferred reaction temperature is 35° C. For hexamethylene diamine and acetaldehyde, the preferred reaction temperature is 0°–10° C.

In the preferred batch procedure the diamine compound is placed in an autoclave or any suitable reaction vessel and the catalyst added as a water slurry. The vessel is purged with nitrogen, then, with efficient agitation and cooling, the aldehyde is added gradually while temperature is maintained at the desired level. When all of the aldehyde has been added, the autoclave is again purged with nitrogen, then with hydrogen to replace the nitrogen. Hydrogenation is then performed in the autoclave, maintaining $H_2$ pressure at about 500 lbs./sq. in. gauge pressure and the temperature as desired until hydrogen is no longer absorbed by the charge. Then, with $H_2$ pressure maintained at 500 lbs., temperature of the charge is raised by about 25° C. and held there for 2 hours. The charge is cooled, the hydrogen vented and the autoclave purged with nitrogen. After addition of filter aid the charge is filtered at a temperature high enough to keep the organic material in solution. The product is normally clear or very light colored. It can be used as is or may be distilled, first removing water and other low boiling impurities, then, at 10 mm. Hg, distilling to a pot temperature suficient to remove essentially all of the desired product. Oxidizing conditions should be avoided.

For continuous or "stream" mixing, the diamine and aldehyde are separately pumped at controlled rates into a mixing vessel which is equipped with efficient cooling and nitrogen blanketing. The mixing vessel affords slight hold-up time of about 5 to 20 minutes, after which the diimine product is pumped into an autoclave containing the hydrogenation catalyst and held at the desired temperature under 600–800 lbs./sq. in. hydrogen pressure. When the desired charge is all in the autoclave, hydrogenation is continued at the same temperature and pressure until hydrogen is no longer absorbed. Then the temperature is raised by about 25° C. and the charge held under the same hydrogen pressure for an additional few hours. Workup is as already described.

EXAMPLES

Examples I–IV

The reaction was carried out by the procedure as described above: the diamine and aldehyde are separately pumped at controlled rates into a mixing vessel which is equipped with efficient cooling and nitrogen blanketing. The mixing vessel affords slight hold-up time of about 5 to 20 minutes, after which the diimine product is pumped into an autoclave containing 0.2% by weight of the hydrogenation catalyst (Engelhard, 5% platinum on carbon) and held at the desired temperature under 600–800 lbs./sq. in. hydrogen pressure. When the desired charge is all in the autoclave, hydrogenation is continued at the same temperature and pressure until hydrogen is no longer absorbed. Then the temperature is raised by about 25° C. and the charge held under the same hydrogen pressure for an additional few hours. Workup is as described above.

The reactants, molar ratios, operating conditions, and results of Examples I–IV are shown in Table I below.

TABLE I

[Amine—33% hexamethylene diamine (HMDA) in water. Aldehyde—Acetaldehyde. Mixing—Stream, 0° C.]

| Example: | Mols aldehyde/ mols HMDA | "Tar" | Yield |
|---|---|---|---|
| I | 1.4 | 4.5 | 84 |
| II | 1.6 | 5.0 | 83 |
| III | 1.8 | 12.0 | 79 |
| IV | 2.0 | 23.0 | 72 |

Examples V–VIII

The procedure was as used in Examples I–IV.
The reactants, molar ratios, operating conditions and results of Examples V–VIII are shown in Table II below.

TABLE II

[Amine—80% hexamethylene diamine (HMDA) in water. Aldehyde—proPionaldehyde. Mixing—Stream, 10° C.]

| Example: | Mols aldehyde/ mols HMDA | "Tar" | Yield |
|---|---|---|---|
| V | 1.6 | 11 | 82 |
| VI | 1.8 | 13 | 81 |
| VII | 2.0 | 15 | 78 |
| VIII | 2.4 | 37 | 49 |

Example IX

Into a suitable autoclave were added 60.5 parts of hexamethylene diamine (85% aqueous solution), and 0.123 part of hydrogenation catalyst (Engelhard, 5% platinum on carbon) slurried in a small amount of water. The autoclave was purged with nitrogen by filling with nitrogen gas several times and venting between additions. With agitation on, 65.2 parts of n-butyraldehyde were added gradually with cooling on the autoclave jacket to maintain temperature in the reaction mixture at 30°–40° C. The mole ratio was 1.74 moles aldehyde to 1.0 mole diamine. This reaction must be carried out in the absence of hydrogen and oxygen, and atmospheric pressure is favored. These conditions were maintained by bleeding nitrogen into the vessel during the mixing period. The reaction between the diamine and the aldehyde occurs almost instantaneously and is somewhat exothermic. The mixing rate must therefore be adjusted so that the required 30°–40° C. temperature range can be maintained with the available cooling.

After all of the n-butyraldehyde was added, the autoclave was prepared for hydrogenation by carefully purging first with nitrogen, then hydrogen. Hydrogen was then applied at 500 lbs. per sq. in. pressure maintaining reaction temperature at 40°–50° C. When hydrogen take-up eased (pressure maintained without adding gas), the temperature was raised to 100° C. and 500 lbs. per sq. in. hydrogen pressure was maintained for an additional 2 hours. About 1.8 parts of hydrogen were required. The charge was then cooled to 80° C., vented and purged with nitrogen to remove the hydrogen, then 0.9 part of filter aid (diatomaceous earth) was added and the charge filtered at over 60° C. At temperatures below 50° C., crystallization of the product may occur. The product was an almost colorless liquid comprising 111 parts of an 80% aqueous solution (crystallizing point about 43° C.) of a mixture of N,N'-dibutyl and N-monobutylhexamethylene diamines, the ratio being about 75 parts N,N'-dibutylhexamethylene diamine to 25 parts of N-monobutylhexamethylene diamine.

When it was desired to remove water and high boiling impurities from the amine mixture, the charge was distilled with minimal fractionation. Water was first removed overhead by heating under reduced pressure (100 mm. mercury) to a pot temperature of 110° C. The main product cut was then distilled at 10 mm. mercury to a pot temperature of 220° C. From 111 parts of crude product there were obtained 100 parts of 75/25 N,N'-dibutylhexamethylene diamine/N-monobutylhexamethylene diamine.

Example X

In this example hexamethylene diamine and propionaldehyde were each pumped at a controlled rate into a cooled mixing vessel which provided a holdup or mixing time of about 15 minutes before the mixture was pumped into the hydrogenation autoclave already containing the hydrogenation catalyst.

Using metering pumps, 157 g. of propionaldehyde and 218 g. of 80% hexamethylene diamine were pumped into a mixing vessel at a rate of 0.81 ml. per minute and 1.0 ml. per minute respectively. The mixing vessel contents were maintained at about 10° C. by external cooling. The mixing vessel provided a hold-up time of about 15 minutes before the reaction mix was pumped into a hydrogenation autoclave containing 1.0 g. of the same catalyst used in Example 1 in 50 g. of water, and in which hydrogen at 800 lbs./sq. in. pressure was maintained. The temperature in the autoclave was controlled at 25°–30° C. Transfer of the entire charge to the autoclave took 4½ hours. Hydrogenation at 800 lbs./hydrogen pressure was continued for 3 hours at 25°–30° C., then at 60° C. for 2 hours before cooling and work-up as in Example 1. Distillation gave 87% of mixed N-mono and N,N'-dipropylhexamethylene diamine with 12% residual still bottoms.

Example XI

In this example acetaldehyde is reacted with hexamethylene diamine in a solvent mixture of water and 2B alcohol (95% ethyl alcohol containing about 0.5% benzene). The product is reduced by catalytic hydrogenation.

Into a suitable flask were added 217 g. anhydrous hexamethylene diamine, 211 g. of water and 200 g. of 2B alcohol. A nitrogen atmosphere devoid of hydrogen was established in the vessel and 132 g. of acetaldehyde were added with agitation over a 6¾ hour period with the temperature in the reaction mass held at about 10° C. After 5 minutes the charge was transferred to an autoclave containing 1 g. of the same catalyst as used in Example 1 and 10 g. of water. Hydrogenation and workup were carried out as in Example X. The yield of mixed mono- and dialkyl amines was 88% of theory.

The embodiments of the invention in which an exclusive property or privilege is claimed are defined as follows:

1. In an aqueous process for preparation of N-alkylated amines of the formula

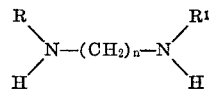

where $n$ equals 2 to 8,

R equals a $C_2$ to $C_6$ alkyl group, and $R^1$ equals R or hydrogen, which process comprises reacting at from about 0° to about 50° C. an aliphatic aldehyde having the formula

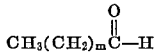

where $m$ equals 0–4; with a diamine having the formula

where $n$ equals 2 to 8 to form a diimine, and subsequently reacting said diimine with hydrogen in the presence of a hydrogenation catalyst, the improvement comprising reacting said aldehyde and said diamine at molar ratios of from about 1.2:1.0 to about 1.9:1.0 in the absence of hydrogen.

2. The process of claim 1 in which $n$ equals 6, R is n-butyl and $m$ equals 2.

References Cited

UNITED STATES PATENTS

| 2,317,757 | 4/1943 | Graft | 260—583 P |
| 2,497,292 | 2/1950 | Bruner | 260—583 P |
| 2,387,873 | 10/1945 | Boon et al. | 260—583 P |
| 2,876,236 | 3/1959 | Szabo et al. | 260—583 PX |

JOSEPH P. BRUST, Primary Examiner

U.S. Cl. X.R.

260—570.9